United States Patent [19]
Reinke et al.

[11] 3,738,636
[45] June 12, 1973

[54] APPARATUS FOR GRIPPING AND HOLDING ELONGATED WORKPIECES PARTICULARLY IN INDUCTION HARDENING MACHINES

[75] Inventors: Friedhelm Reinke, Remscheid; Edgar Stengel, Wuppertal-Hahnerberg, both of Germany

[73] Assignee: AEG-Elotherm GmbH, Remscheid-Hasten, Germany

[22] Filed: May 24, 1971

[21] Appl. No.: 146,190

[30] Foreign Application Priority Data
May 23, 1970  Germany................... P 20 25 227.1

[52] U.S. Cl................. 269/49, 269/227, 269/254 R
[51] Int. Cl.............................................. B23q 3/06
[58] Field of Search ................. 269/57, 50, 49, 212, 269/218, 221, 227, 254 R, 254 CS, 142, 145, 315, 317; 82/40, 41, 2.5, 2.7; 279/106; 148/150, 154; 266/4 E, 5 E

[56] References Cited
UNITED STATES PATENTS

| | | |
|---|---|---|
| 2,794,894 | 6/1957 | Tudbury............................ 266/4 E |
| 3,648,995 | 3/1972 | Seyfried et al................. 148/150 X |
| 947,174 | 1/1910 | Dodds............................. 269/227 X |
| 2,679,177 | 5/1954 | Gepfert........................... 269/227 X |

*Primary Examiner*—Robert L. Spruill
*Attorney*—Cushman, Darby & Cushman

[57] ABSTRACT

Apparatus for chucking and holding an elongated workpiece, for example, for an induction heating device, so that a workpiece reference surface bears against a fixed abutment and is always located at the same place. In the embodiment described below, two opposed clamps mounted in a frame are urged toward one another by compression springs to hold a workpiece axially. To release a workpiece, one of the clamps is moved away from the other which follows as urged by its compression spring. An intermediate member is mechanically linked to the first mentioned clamp by two racks and a pinion so that the member moves in the opposite direction and, after a predetermined travel, engages the second mentioned clamp to cause it to also move away from the first mentioned clamp and release the workpiece. A chuck having jaws which pivotably close over the edges of a flange is preferably associated with the second mentioned clamp and either the flange surface held by the jaws or the opposite surface can serve as the reference surface.

10 Claims, 6 Drawing Figures

APPARATUS FOR GRIPPING AND HOLDING ELONGATED WORKPIECES PARTICULARLY IN INDUCTION HARDENING MACHINES

The invention relates to a method of and apparatus for chucking up and holding elongated workpieces having cross sections that may change in abrupt steps, particularly in induction hardening machines which employ clamping devices that grip a workpiece between them with those parts of the clamping devices which axially align the workpiece movable along the direction of the workpiece axis.

Devices in induction hardening machines which permit elongated workpieces to be automatically gripped between axially movable spindles which also impart rotation to the workpiece during the hardening process have been known for a long time. The axially movable spindles serve the additional purpose of taking up any axial expansion of the workpiece during inductive heating.

In the present applicants' earlier U.S. Pat. No. 3,504,151, an arrangement is disclosed in which the movable spindles are kinematically coupled. The object of this arrangement is to keep a desired point in the middle of the workpiece, such as a flange or a change in cross section, in a constant invariant position in relation to the hardening device, particularly with respect to the inductors that are mounted in the machine frame, irrespective of any axial expansion of the workpiece.

The object of the present invention is to provide a method and apparatus that will permit the point of the workpiece that is to remain in an invariant position in relation to the inductor to be a point at one end of the workpiece. This would be needed for example when a fillet requires hardening at one end of the workpiece and the coupling gap between the fillet and an inductor that is fixed in relation to the workpiece axis is to maintain a constant width.

The method of chucking up and holding an elongated workpiece according to the invention is accomplished in that a workpiece reference surface across the axis of the mounted workpiece bears directly — or indirectly through a part of the first clamping device — against a fixed abutment. For removing the workpiece, the movable part of the other, second, clamping device is shifted in a direction axially away from the workpiece, the workpiece and an associated axially shiftable part of the first clamping device initially participating in the shift of the part of the second clamping device. This shift is accompanied by a contrary and, particularly, a proportional shift of an intermediate member. In a final phase of the process of workpiece removal the part of the first clamping device which is connected to the workpiece is coupled to the intermediate member, causing the shiftable parts of the two clamping devices now to move away from each other and to release the workpiece. For mounting the workpiece the consecutive order of the above specified steps is reversed.

The apparatus according to the invention for performing this method includes a first energy storage means such as a spring, which uses its energy to urge a shiftable part of the first clamping device axially against the workpiece, and a second energy storage means, such as another spring, which uses its energy to urge a shiftable part of the second clamping device axially against the workpiece, and which, by overcoming the thrust of the first energy storage means, presses the workpiece itself or, through the workpiece, a part of the first clamping device against a fixed abutment.

In an advantageous embodiment of the invention the shift of that part of the first clamping device which bears against the workpiece reference surface, is coupled to the intermediate member by the latter being formed with a stop face which entrains that part of the first clamping device against the resistance of the thrust of the first energy storage means. According to another useful aspect of the invention, the axially shiftable part of the second clamping device and the intermediate member, which are each connected to an associated rack, are geared together to shift proportional distances in opposite directions. Where the contrary shifts are required to be equal in magnitude, the gearing may preferably be constituted by a pinion between and meshing with both racks. In a further advantageous embodiment of the invention the first clamping element may be formed with a center which engages the workpiece reference surface.

In a different likewise advantageous embodiment, the apparatus is desired for chucking up workpieces with a flange at one end. The first clamping device may comprise a chuck fitted with jaws adapted pivotably to close over the edge of the flange and, if the flange surface facing the shaft is used as the reference surface, the part of the first clamping device connected to the jaws may bear against the fixed abutment, so that, when the surface of the flange facing the center is used as the reference surface, the latter bears directly against the solid clamping face of the chuck.

Preferred embodiments of apparatus according to the invention are illustratively shown in the drawings in which.

Figure 1:
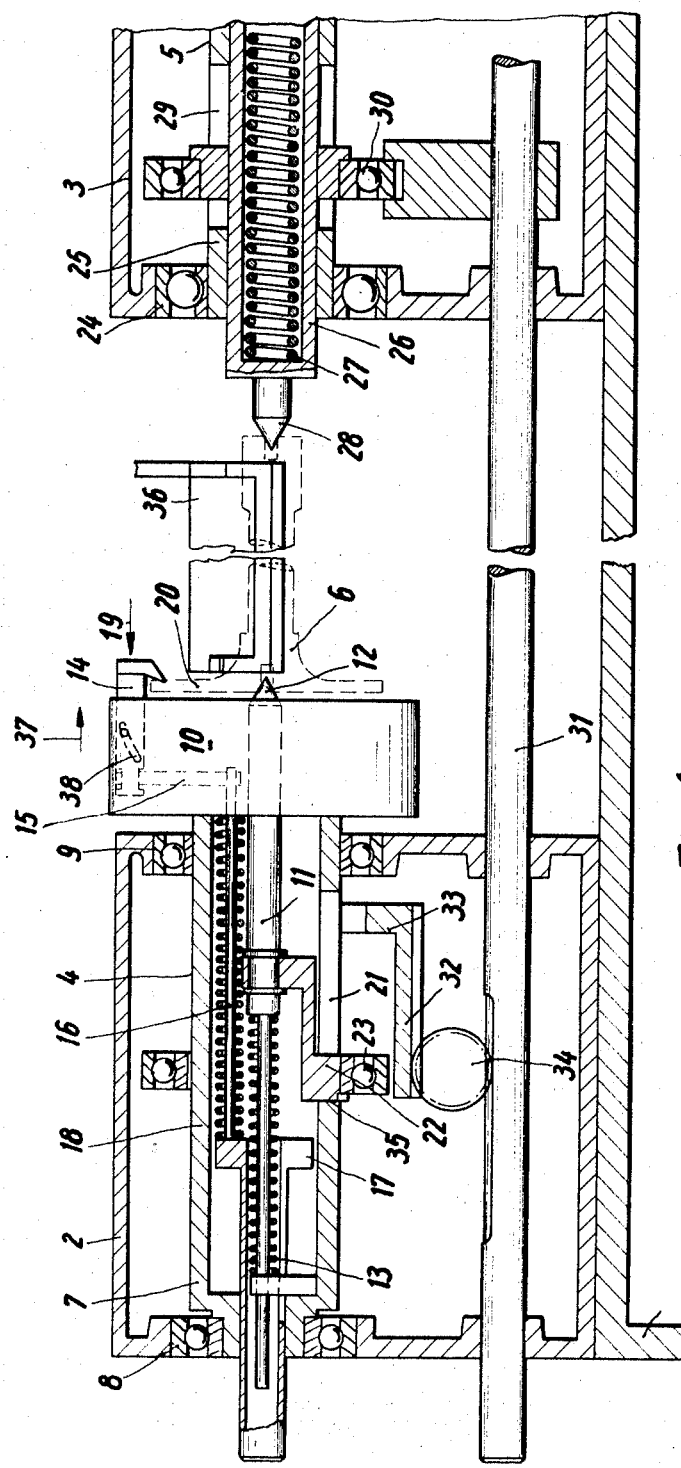
FIG. 1 shows a first embodiment of the proposed apparatus in section.

The frame 1 of an induction hardening machine carries two casings 2 and 3 for the accommodation of clamping devices 4 and 5 between which the workpiece 6, in this example the half shaft of a motor vehicle rear axle, is mounted. The clamping devices are contrived so that they are capable of imparting rotation to the mounted workpiece 6.

The left hand clamping device 4 comprises a hollow shaft 7 which is rotatably mounted in bearings 8 and 9 in the casing 2 and which carries a chuck 10. Axially movably mounted inside this hollow shaft is a stock 11. At its end, stock 11 carries a center 12 which is urged against the workpiece 6 by compression spring 13 and thus keeps the workpiece in axial alignment.

The chuck 10 of this first workpiece clamping device 4 is fitted with three clamping jaws 14 distributed at angular intervals of 120° around the circumference of the chuck, only one of the jaws being shown in the drawing.

Each jaw is connected by a bridge member 15 and a drawrod 16 to a common piston 17 which is axially slidable inside the hollow shaft 7. Each drawrod is associated with a compression spring 18 which applies thrust to the piston 17 in a direction to pull the jaws 14 in the direction of the arrow 19 against the side of the terminal flange 20 facing the half shaft 6, the flange being thus kept in contact with the center 12 on the end of spindle 11. Stock 11 is connected, by a part 22 which is slidable in a slot 21 in the hollow shaft 7, to the inner ring of a ball bearing 23 that is axially movable on hollow shaft 7.

The second clamping device 5 likewise comprises a hollow shaft 25 which is rotatably mounted inside casing 3, and which contains an axially movable stock 26. The end of the stock carries a center 28 which is urged by an internal compression spring 27 against the end of the workpiece remote from the flange 20 and thus keeps the workpiece in central alignment. Hollow shaft 25 is formed with slots 29 through which the stock 26 is connected to the inner ring of a ball bearing 30. The outer ring of this ball bearing is attached to an axially shiftable rack 31 which is mounted in both casings 2 and 3. An intermediate member 32, likewise having the form of a rack and axially movable (not shown in the drawing) inside the casing 2 has a stop face 33 which is designed to cooperate with the outer ring of the ball bearing 23.

Rack 31 and intermediate member 32 both mesh with a pinion 34 mounted inside the casing 2 in such manner that a displacement of the rack 31 causes a contrary like displacement of intermediate member 32.

Since the spring thrust of the compression spring 27 of the right hand clamping device 5 exceeds that of the spring 13 of the left hand clamping device 4 the center 28 is forced against the work 6 and the latter presses against stock 11 which compresses spring 13 so that extension 22 bears against fixed abutment face 35. Consequently the surface of the workpiece in contact with center 12 provides a reference plane which is always in the same prescribed position in relation to the frame 1 of the machine and to the inductor arrangement indicated at 36 which is mounted in an axially fixed position in the machine frame.

The described arrangement in FIG. 1 functions as follows. For the purpose of removing the work, flange 20 must first be released by the jaws 14 of the chuck 10. To this end, means acting on the free end of the piston 17, but not shown in the drawing, operate to shift the piston 17, the drawrods 16, the bridges 15 and hence the jaws 14 in the direction of the arrow 37. This displacement causes the jaws 14 to withdraw from the flange 20 and to be deflected to one side by deflecting means in the form of a cam slot 38. The principal parts of the mechanism will now be in the position schematically indicated in FIG. 2.

Figure 3:
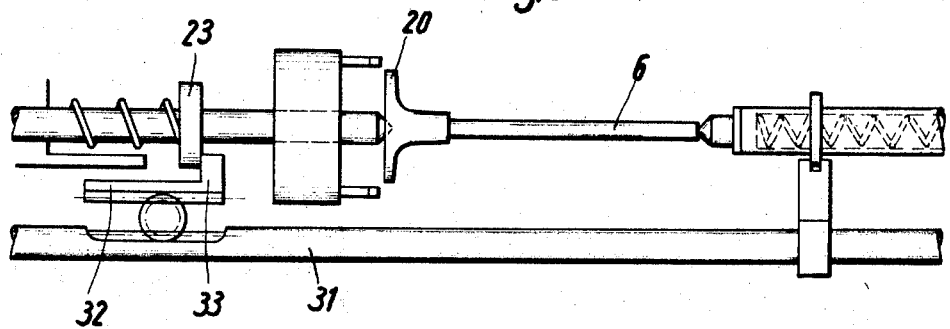
FIG. 3 shows a schematic of the embodiment of FIG. 1 with the stop face of the intermediate member just contacting the ring on the stock.
Figure 4:
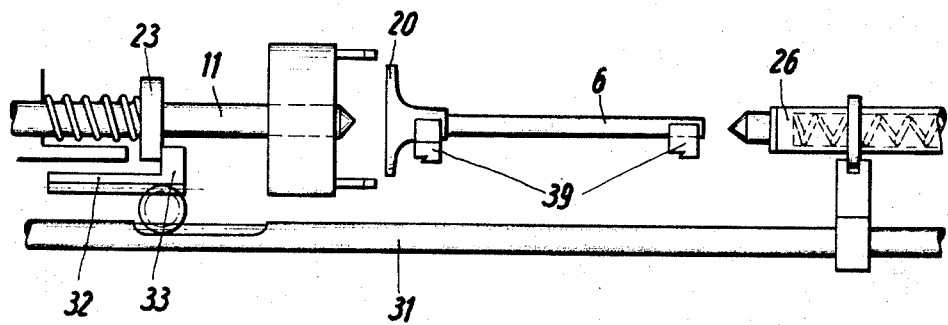
FIG. 4 shows a schematic of the embodiment of FIG. 1 with the workpiece released.

For continuing the release of the work, a force applied to the left hand end of rack 31 causes the latter, together with stock 26 to be moved to the right, overcoming the resistance of spring 27. Work 6 and stock 11 will first participate in this displacement by virtue of the thrust exerted by the spring 13. The rack and pinion transmission results in the displacement of rack 31 being accompanied by a like displacement of intermediate member 32 in the opposite direction. In the course of the continued displacement to the left of intermediate member 32 its stop face 33, as shown in FIG. 3, will eventually strike the outer ring of bearing 23 mounted on stock 11. The further displacement of rack 31 and of intermediate member 32 therefore causes the latter, by means of its stop face 33, to entrain stock 11 which now reverses its direction of motion and moves away from stock 26 of the other clamping device 5. The workpiece 6 is thus released as shown in FIG. 4. Workpiece 6 may now be received on the supporting surfaces of a lifting beam conveyor (not shown) and carried away in a direction normal to the plane of the paper. A fresh workpiece 6 is now mounted by performing the above described steps in reverse.

A special sequence of the machining steps during the production of the workpiece 6 often fails to ensure that the center punch mark in the flanges of the several workpieces of a batch is always in the same position with respect to the surface of the flange 20 on the side of the shaft. In such a case the surface of the flange facing the shaft is preferably used as the reference surface. This can be done by slightly modifying the embodiment shown in FIG. 1 in the manner illustrated in FIG. 5, which shows only that part of the arrangement which contains the clamping device associated with the chuck, the second clamping device (that situated on the right in the drawing) being identical with the corresponding device illustrated in FIG. 1. The same reference numbers as in FIG. 1 are used in FIG. 5 for identifying the same parts.

Figure 2:
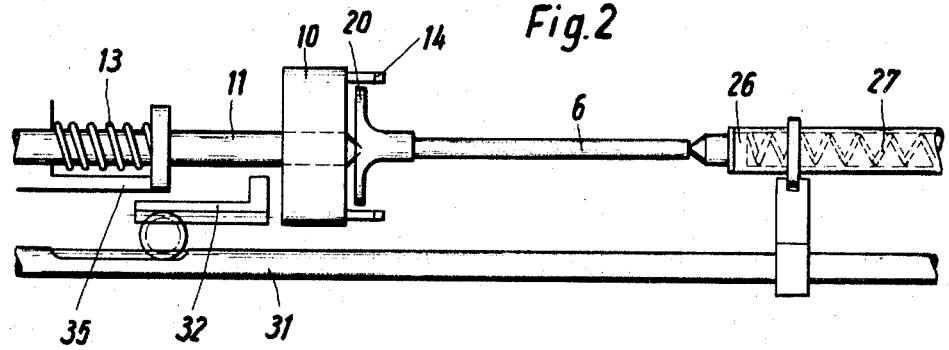
FIG. 2 shows a schematic of the embodiment of FIG. 1 with the chuck jaws open.

The principal difference between this modified arrangement and that in FIG. 1 is that when the workpiece is mounted it is the piston 17 connected to the jaws 14 that bears against a fixed stop 35' inside hollow shaft 7' and not a part connected to stock 11. Flange 20 of the workpiece is gripped between the jaws 14, on the one hand, and the stock 11 which is loaded by the compression spring 13 and several resilient rests 41 inserted in the faceplate 40 of the chuck, on the other hand.

The manner in which this embodiment functions will be hereinafter made clear by describing the process of mounting a workpiece by reference to FIGS. 3 and 4 in which the stop face 35 must be assumed to be absent. The workpiece 6 resting on the bearing surfaces of a lifting beam conveyor is conveyed between the centers of the machine. Rack 31 is then shifted to the left, a movement accompanied by a shift of intermediate member 32 to the right. Since in this initial phase of the process of mounting the work, stock 11 is coupled with intermediate member 32 by bearing against abutment face 33, the centers 12 and 27 will close on the work, gripping the same between them as shown in FIG. 3.

Figure 5:
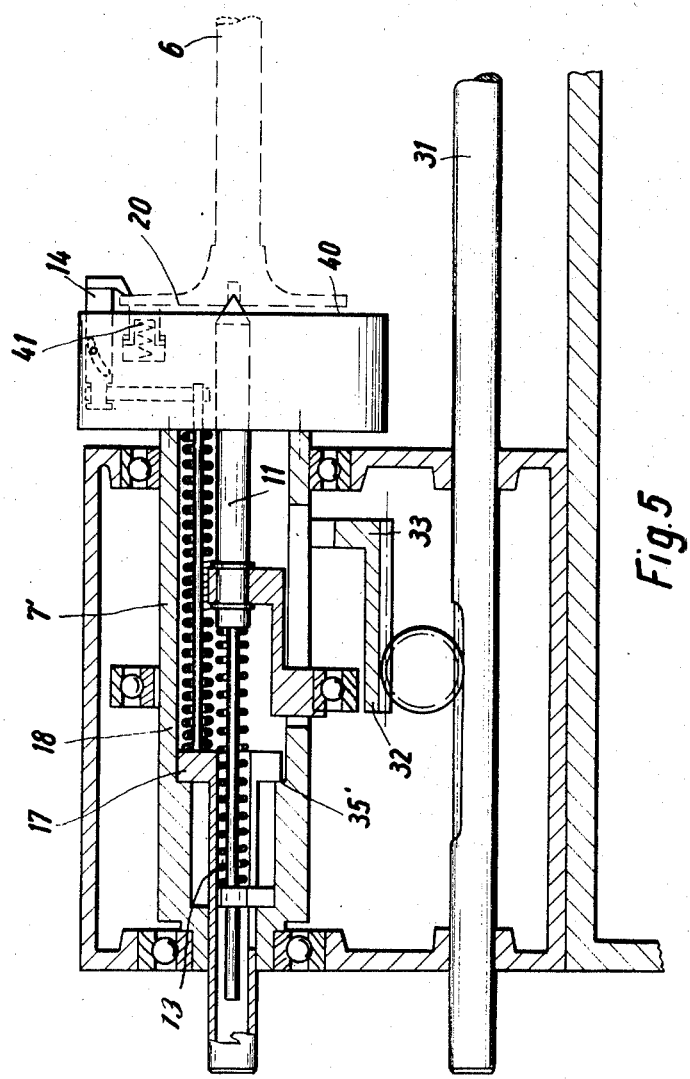
FIG. 5 shows a further embodiment in which the surface of a flange facing the shaft is the reference plane.

Rack 31 together with the stock 26 continues its movement to the left pushing the work 6 and the stock 11, against the resistance of the spring 13, until flange 20, as shown in FIG. 5, makes contact with the resilient rests 41 in the face of the chuck 10. Jaws 14, which had been in their right hand end position, i.e., in deflected open position when the process of mounting began, are now moved to the left by the pressure of the spring 18 and the release of the piston 17. The jaws 14 therefore pivotably close on the flange 20, making contact with the face of the flange on the side of the workpiece shaft and pressing the flange against the spring rests 41 and the resistance of the spring 13 a further short way to the left until the jaws 14 reach their final position when the piston 17 meets the fixed abutment 35'. This means that the surface of the flange facing the shaft has been made the reference plane. Unaffected by any dimensional differences in the workpieces, this surface will now always be located in the same prescribed position relative to the machine frame 1.

Figure 6:
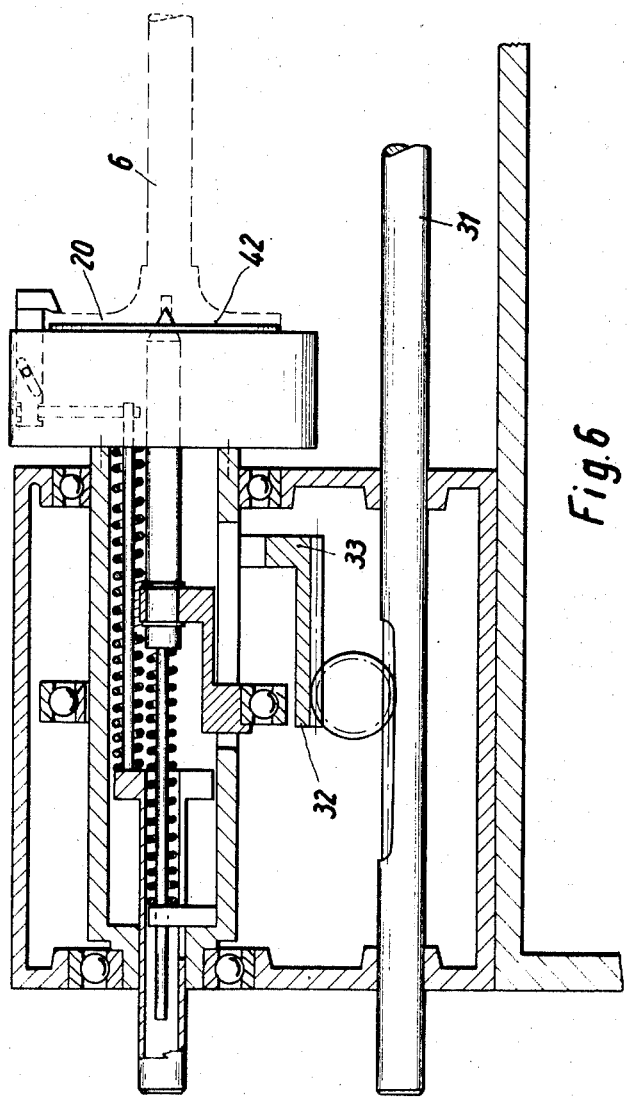
FIG. 6 shows a further embodiment in which the flange surface facing the chuck is the reference plane.

Another possible modification shown in FIG. 6 which like FIG. 5 illustrates only the left hand clamping device, may with advantage be used when the machining sequence during the production of the work is such that the thickness of the flange 20 in a batch of workpieces that are to be treated is always the same. In such a case the surface of the flange facing the center may be used as the reference plane, said surface being that which, when the workpiece has been mounted, bears against the solid face 42 of chuck 10. In this modification the process of removing and chucking up the work proceeds as in the embodiments shown in FIGS. 1 and 5.

What is claimed is:

1. Apparatus for chucking up and holding an elongated workpiece comprising first and second clamping means each having axially movable portions for gripping between them said workpiece in axial alignment and means for mounting said first and second clamping means including a fixed abutment, the first clamping means including a first abutment adapted to bear against a workpiece reference surface across the axis of the mounted workpiece and a second abutment located in a predetermined invariant relation to said first abutment and adapted to bear against said axially fixed abutment, said first and second clamping means each including associated means for urging an axially movable portion of the same clamping means toward the other clamping means, the apparatus further comprising operating means associated with one of said clamping means for moving axially movable portions of the same clamping means in the direction away from the other clamping means, intermediate member means being separated from an axially movable portion of said other clamping means in the chucking up and holding phase of the apparatus and adapted to engage with the said axially movable portion of said other clamping means and for moving it in the direction away from said one clamping means, and mechanically linking means linking said intermediate member means with said axially movable portion of said one clamping means for moving said intermediate member means always in opposite direction of any movement of said axially movable portion of said one clamping means.

2. Apparatus as in claim 1 wherein said mechanically linking means includes a first rack connected to the said axially movable portion of the said one clamping means and a second rack carried by said intermediate member means and a pinion which meshes with said first and second racks.

3. Apparatus as in claim 1 wherein said each said axially movable portions of said first and second clamping means includes a stock for engaging the center of a workpiece.

4. Apparatus as in claim 1 wherein said first and second abutments are comprised in said axially movable portion of said first clamping means.

5. Apparatus as in claim 3 wherein said each said axially movable portions of said first and second clamping means includes a stock for engaging the center of a workpiece and the point of said stock associated with said axially movable portion of said first clamping means forms said first abutment.

6. Apparatus as in claim 1 wherein said first clamping means includes a chuck fitted with jaws to pivotally close over the edge of a workpiece flange.

7. Apparatus as in claim 6 wherein said jaws are included in said axially movable portion of said first clamping means.

8. Apparatus as in claim 7 wherein said first and second abutments are comprised in said axially movable portion of said first clamping means and said jaws form said first abutment and means are included in said first clamping means for urging said workpiece flange against the jaws.

9. Apparatus as in claim 1 wherein the axially fixed abutment is identical to the said first and second abutment.

10. Apparatus as in claim 1 wherein each said urging means includes a spring.

* * * * *